(12) United States Patent
Gonzalez de Langarica et al.

(10) Patent No.: US 10,623,983 B2
(45) Date of Patent: Apr. 14, 2020

(54) SERVICE AWARE OVERLOAD HANDLING IN A COMMUNICATION NETWORK

(71) Applicant: Telefonaktiebolaget LM Ericsson (publ), Stockholm (SE)

(72) Inventors: Ester Gonzalez de Langarica, Stockholm (SE); Cormac Hegarty, Bromma (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 15/531,219

(22) PCT Filed: Dec. 23, 2014

(86) PCT No.: PCT/EP2014/079228
§ 371 (c)(1),
(2) Date: May 26, 2017

(87) PCT Pub. No.: WO2016/102016
PCT Pub. Date: Jun. 30, 2016

(65) Prior Publication Data
US 2017/0332276 A1    Nov. 16, 2017

(51) Int. Cl.
*H04W 28/02*    (2009.01)
*H04L 29/06*    (2006.01)

(52) U.S. Cl.
CPC ..... *H04W 28/0289* (2013.01); *H04L 65/1006* (2013.01); *H04L 65/1016* (2013.01);
(Continued)

(58) Field of Classification Search
CPC .......... H04W 28/0289; H04W 28/0268; H04L 65/1016; H04L 65/1076; H04L 65/1069; H04L 65/80; H04L 65/1006
See application file for complete search history.

(56) References Cited

U.S. PATENT DOCUMENTS

2010/0034085 A1    2/2010    Qiu et al.
2010/0074100 A1*   3/2010    Suzuki ............... G06F 11/2025
                                                                        370/221
(Continued)

OTHER PUBLICATIONS

Gurbani, V. et al., "Session Initiation Protocol (SIP) Overload Control", SOC Working Group Internet-Draft, Intended Status: Standards Track, Expires: Sep. 13, 2012, Mar. 12, 2012, pp. 1-35, IETF Trust.
(Continued)

*Primary Examiner* — Omar J Ghowrwal
(74) *Attorney, Agent, or Firm* — Patent Portfolio Builders, PLLC

(57) ABSTRACT

A node (100) of a communication network receives a request (101) relating to one of multiple services. Further, the node (100) determines whether an overload with respect to the service is present. In response to determining absence of an overload with respect to the service, the node (100) forwards the request (101) for further processing. In response to determining presence of an overload with respect to the service, the node (100) responds to the request with a failure message (102) indicating that the request was not processed. The failure message (102) comprises an indication of a time window after which the request (101) may be retried and an identifier of the service to which the request (101) relates.

26 Claims, 6 Drawing Sheets

(52) U.S. Cl.
CPC ...... *H04L 65/1069* (2013.01); *H04L 65/1076* (2013.01); *H04L 65/80* (2013.01); *H04W 28/0268* (2013.01)

(56) References Cited

U.S. PATENT DOCUMENTS

| | | | |
|---|---|---|---|
| 2010/0136970 A1* | 6/2010 | Mui | H04L 65/1073 455/435.1 |
| 2010/0238919 A1* | 9/2010 | Froelich | H04L 51/04 370/352 |
| 2012/0042084 A1* | 2/2012 | Dutta | H04L 65/1016 709/228 |
| 2014/0006630 A1 | 1/2014 | Cai et al. | |

OTHER PUBLICATIONS

Office Action issued in EP application No. 14816333.0 dated Jun. 21, 2019, 5 pages.

* cited by examiner

SERVICE AWARE OVERLOAD HANDLING IN A COMMUNICATION NETWORK

TECHNICAL FIELD

The present invention relates to methods for providing services in a communication network and to corresponding devices.

BACKGROUND

In communication networks, such as cellular networks as specified by 3GPP ($3^{rd}$ Generation Partnership Project), it is known to provide various kinds of packet based services to a UE (user equipment), such as multimedia telephony services or messaging services. For example, in a 3GPP network such services may be provided by an architectural framework referred to as IMS (Internet Protocol Multimedia Subsystem). Details of the IMS are for example specified in 3GPP TS 23.228 V12.7.0 (2014-12). The IMS, but also various other kinds of packet based services, involve utilization of a control plane protocol referred to as SIP (Session Initiation Protocol), as for example specified in IETF RFC 3261 (June 2002), for establishing a session between a client utilizing the service and a server providing the service.

In many cases, the communication network may provide multiple application servers which provide multiple different services. Such application servers may have different capacities and the utilization of the provided service may vary individually for each application server. Accordingly, overload situations may occur in which one or more of the application servers is overloaded while one or more others of the application servers are not overloaded.

For addressing overload situations, the SIP provides a throttling mechanism based on a retry-after time window indicated in a header of a failure message. In the case of the IMS, the throttling mechanism may for example be implemented at a node acting as a proxy node for SIP messages between the IMS client and an IMS CN (IMS core network) and the application servers, such as a P-CSCF (Proxy Call Session Control Function) and IBCF (Interconnect Border Control Function). Further details concerning the handling of SIP messages by the P-CSCF and the IBCF can for example be found in 3GPP TS 24.229 V12.6.0 (2014-09).

Such proxy node typically operates on the basis of "windows" of SIP requests which are currently being handled. When the window is full, the proxy node does not forward the SIP request to the IMS CN but responds to it with an SIP failure response with response code 503 (Service Unavailable). This SIP failure response indicates that the server is undergoing maintenance or is temporarily overloaded and therefore cannot process the request. A "Retry-After" header field may specify when the client may reattempt its request. Upon receiving the SIP failure response, the client will not reattempt a new SIP request but will wait for the time period indicated in the Retry-After header field before sending a new SIP request. Such throttling mechanism may be implemented on an SIP method level, i.e., the windows and Retry-After time window may be provided individually for different SIP methods, such as REGISTER, SUBSCRIBE, or INVITE.

However, in the above-mentioned situations where an overload occurs only for a part of the different application servers, the existing throttling mechanism may provide unsatisfactory results: It is quite common that different services use the same SIP method. For example, MMTel (Multimedia Telephony) and RCS (Rich Communication Suite) group chat both utilize the SIP INVITE method. Nonetheless, the corresponding application servers may have different capacity and may be subject to different traffic load. Accordingly, in an exemplary overload scenario the application server for RCS group chat may be overloaded while the application server for MMTel is not overloaded. If in this situation a UE tries to establish an RCS group chat session by sending an SIP INVITE request, the proxy node would respond with an SIP 503 failure response. If the UE then sends a further SIP INVITE request to establish an MMTel session, the proxy node may send an SIP 503 failure response as well, even though the corresponding application server is not overloaded. Further, 3GPP TS 24.229, section 5.1.3.1 specifies that upon receiving a SIP 503 failure response containing a Retry-After header field, the UE shall not automatically reattempt the request until after the time period indicated by the Retry-After header field has expired. Therefore, the UE may refrain from even sending the SIP INVITE request to establish the MMTel session. Accordingly, one service may be rejected due to an overload which is actually only present with respect to another service. This is undesirable from the perspective of service availability and user experience.

Accordingly, there is a need for techniques which allow for efficiently controlling multiple services in a communication network.

SUMMARY

According to an embodiment of the invention, a method of controlling multiple services in a communication network is provided. According to the method, a node of the communication network receives a request relating to one of the services. Further, the node determines whether an overload with respect to the service is present. In response to determining absence of an overload with respect to the service, the node forwards the request for further processing. In response to determining presence of an overload with respect to the service, the node responds to the request with a failure message indicating that the request was not processed. The failure message comprises an indication of a time window after which the request may be retried and an identifier of the service to which the request relates.

According to a further embodiment of the invention, a method of controlling multiple services in a communication network is provided. According to the method, a communication device sends a request relating to one of the services to the communication network. In response to the request, the communication device receives a failure message from the communication network. The failure message indicating that the request was not processed and comprises an indication of a time window after which the request may be retried and an identifier of the service to which the request relates. Before expiry of the time window, the communication device determines a need to send a further request relating to one of the services to the communication network. Depending on whether the further request relates to the service indicated in the failure message or to another one of the services, the communication device controls sending of the further request to the communication network.

According to a further embodiment of the invention, a node for a communication network is provided. The node at least one interface for transmitting control plane messages relating to multiple services supported by the communication network. Further, the node comprises at least one processor. The at least one processor is configured to receive a request relating to one of the services. Further, the at least one processor is configured to determine whether an overload with respect to the service is present. Further, the at least one processor is configured to, in response to determining absence of an overload with respect to the service, forward the request for further processing. Further, the at least one processor is configured to, in response to determining presence of an overload with respect to the service, respond to the request with a failure message. The failure message indicates that the request was not processed and comprises an indication of a time window after which the request may be retried and an identifier of the service to which the request relates.

According to a further embodiment of the invention, a communication device is provided. The communication device comprises at least one interface for utilizing multiple services supported by a communication network. Further, the communication device comprises at least one processor. The at least one processor is configured to send a request relating to one of the services to the communication network. Further, the at least one processor is configured to receive, in response to the request, a failure message from the communication network. The failure message indicates that the request was not processed and comprises an indication of a time window after which the request may be retried and an identifier of the service to which the request relates. Further, the at least one processor is configured to determine, before expiry of the time window, a need to send a further request relating to one of the services to the communication network. Further, the at least one processor is configured to control sending of the further request to the communication network depending on whether the further request relates to the service indicated in the failure message or to another one of the services.

According to a further embodiment of the invention, a computer program or computer program product is provided, e.g., in the form of a non-transitory storage medium, which comprises program code to be executed by at least one processor of a node of a communication network. Execution of the program code causes the at least one processor to receive a request relating to one of multiple services supported by the communication network. Further, execution of the program code causes the at least one processor to determine whether an overload with respect to the service is present. Further, execution of the program code causes the at least one processor to, in response to determining absence of an overload with respect to the service, forward the request for further processing. Further, execution of the program code causes the at least one processor to, in response to determining presence of an overload with respect to the service, respond to the request with a failure message. The failure message indicates that the request was not processed and comprises an indication of a time window after which the request may be retried and an identifier of the service to which the request relates.

According to a further embodiment of the invention, a computer program or computer program product is provided, e.g., in the form of a non-transitory storage medium, which comprises program code to be executed by at least one processor of a communication device for operation in a communication network. Execution of the program code causes the at least one processor to send to the communication network a request relating to one of multiple services supported by the communication network. Further, execution of the program code causes the at least one processor to receive, in response to the request, a failure message from the communication network. The failure message indicates that the request was not processed and comprises an indication of a time window after which the request may be retried and an identifier of the service to which the request relates. Further, execution of the program code causes the at least one processor to determine, before expiry of the time window, a need to send a further request relating to one of the services to the communication network. Further, execution of the program code causes the at least one processor to control sending of the further request to the communication network depending on whether the further request relates to the service indicated in the failure message or to another one of the services.

Details of such embodiments and further embodiments will be apparent from the following detailed description of embodiments.

DETAILED DESCRIPTION OF EMBODIMENTS

Figure 1:
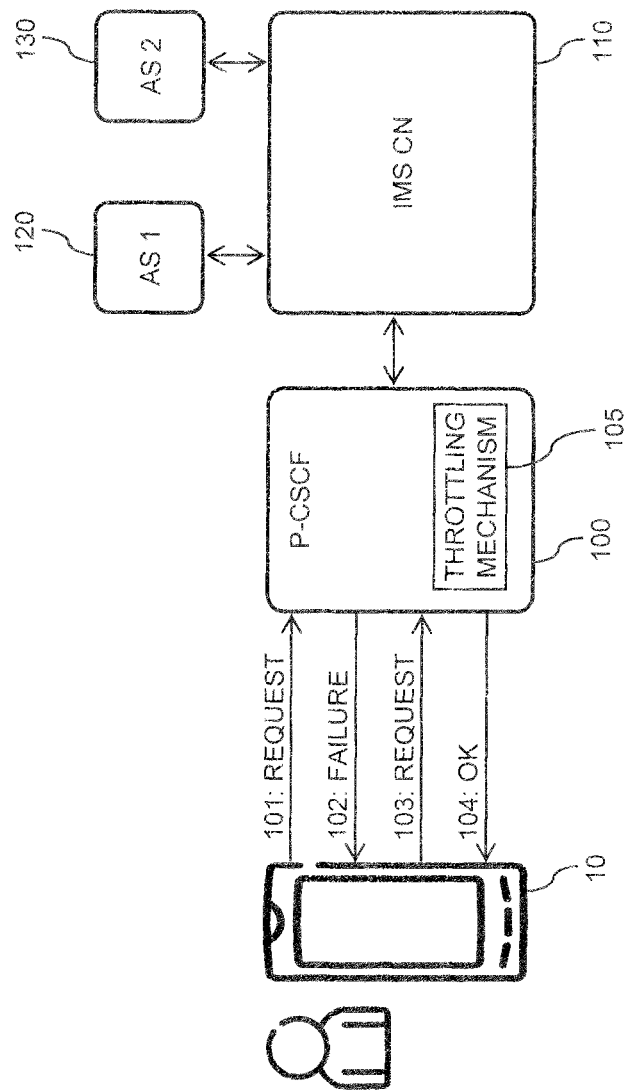
FIG. 1 schematically illustrates an architecture as applied according to an embodiment of the invention for providing multiple services in a communication network.

In the following, concepts in accordance with exemplary embodiments of the invention will be explained in more detail and with reference to the accompanying drawings. The illustrated embodiments relate to providing multiple services in a communication network. In the illustrated examples, it is assumed that the communication network is a cellular network as specified by 3GPP, and that the cellular network implements an IMS architecture for providing the services. However, it is to be understood that other network technologies, e.g., non-3GPP cellular network technologies, non-cellular wireless network technologies, or even wire-based network technologies could be applied as well. Further, the illustrated concepts may also be applied with respect to services not based on the IMS.

In the illustrated concepts, a throttling mechanism for control plane traffic associated with establishing sessions of the services is implemented in a service aware manner. For this purpose, a node of the network which receives a request related to one of the services first determines whether an overload with respect to the service is present or not. The request may be an SIP request for establishing a session of the service, e.g., an SIP INVITE request. In the case of absence of an overload with respect to the service, the node may forward the request for further processing, e.g., by a corresponding application server. Accordingly, the node may act as a proxy node for requests relating to the services. In the case of presence of an overload with respect to the service, the node responds to the request with a failure message, e.g., a SIP failure response of the server failure response category (identified by a response code of the form 5xx). The failure response may also indicate that the failure is due to an overload of an individual server. For this purpose, a corresponding message type could be defined, e.g., in the server failure response category. Alternatively, an existing failure response could be provided with a corresponding additional indication, e.g., in the form of an information field in the message header. Similar to the existing SIP throttling mechanism, the failure message indicates a time window after which the sender of the request may retry sending the request, e.g., in the form of the Retry After field. Further, the failure message indicates the service to which the request relates, e.g., in the form of a service identifier.

In the case of the assumed example of IMS services, the identifier may for example correspond to an ICSI (IMS Common Service Identifier). For some IMS services, the ICSI is typically included in a PAS (P-Asserted Service) header of the SIP INVITE request. Details of the PAS header can be found in IETF RFC 6050 (2010-11). Accordingly, in some implementations, a service identifier indicated in the request received by the node may be utilized to determine the service and also be included in the failure message. In cases where no ICSI or similar service identifier is included in the request, other ways may be utilized for deducing the service and determining the service identifier too be included in the failure message. For example, the service may be determined from other information in the header of the request, e.g., from information fields referred to as "Contact", "Accept-Contact", "Content-Type", or the like. For example, in the case of an OMA IM (Open Mobile Alliance) chat/group chat service, the SIP INVITE request includes a tag "+g./oma.sip-im" in the Accept-Contact and Contact information fields, which may be used as a basis for identifying the service.

FIG. 1 illustrates an exemplary architecture which may be utilized to implement the concepts as outlined above. In particular, FIG. 1 shows a UE 10 connected to the communication network, which includes a P-CSCF 100, an IMS CN 110, a first application server (AS 1) 120, and a second application server (AS 2) 130. The first application server 120 and the second application server 130 are assumed to provide different services. For example, the first application server 120 may provide a messaging service, such as OMA IM Chat/Group Chat CPM (Converged IP messaging) service, and the second application server 130 may provide a multimedia telephony service, such as MMTel. Due to the different nature of the services, the first application server 120 and the second application server 130 may have different capacities, further the load on the application servers 120, 130 may vary in an individually different way. Accordingly, situations may occur in which for one of the application servers 120 there is an overload situation, while of the other of the application servers there is no such overload situation.

The P-CSCF 100 of FIG. 1 acts as a common proxy node for control plane messages concerning sessions of the services provided by the application servers 120, 130. These proxy node functionalities involve forwarding SIP requests from service clients implemented at the UE 10 towards the IMS CN 110 and forwarding SIP responses to these SIP requests from the IMS CN 110 to the service clients. Further, the P-CSCF is also assumed to implement a throttling mechanism 105 for protecting the IMS CN 110 and the application servers 120, 130 from congestions which may arise in overload situations, such as simultaneous mass registrations or session establishment by a plurality of UEs.

The throttling mechanism 105 operates by detecting overload situations in a service specific manner and also sending failure responses for such overload situations in a service specific manner. In FIG. 1 this is illustrated for an exemplary scenario assuming that the first application server 120 is overloaded, while the second application server 130 is not overloaded.

As illustrated, the UE 10 sends a first SIP request 101, e.g., an SIP INVITE request, to the network for establishing a session of the service provided by the first application server 120. Upon receiving the first SIP request 101, the P-CSCF 100 detects that there is an overload with respect to the service provided by the first application server 120. Accordingly, the P-CSCF 100 does not forward the first SIP request 101 to the IMS CN 110, but rather sends a failure message 102. As mentioned above, the failure message 102 indicates the service to which the SIP request 101 relates. Further, the failure message 102 indicates a Retry-After time window. Further, the failure message 102 may also indicate a type of the failure, i.e., that the failure is due to an overload with respect to the specific service. For example, a server failure response type may be defined for situations in which there is an overload with respect to a specific service, and the failure message 102 may correspond to this failure response type.

As further illustrated by FIG. 1, the UE 10 then sends a second SIP request 103 to the network. The further SIP request 103 is assumed to relate to the same SIP method as the first SIP request 101. For example, if the first SIP request 101 is an SIP INVITE request, also the second SIP request 103 would be an SIP INVITE request. Further, the second SIP request 103 is assumed to be sent before expiry of the Retry-After time window indicated in the failure message 102. The second SIP request 103 has the purpose of establishing a session of the service provided by the second application server 130. Because the second SIP request relates to another service than the service indicated in the failure message 102, the UE 10 sends the second SIP request 103 irrespectively of the Retry-After time window not having expired. Upon receiving the second SIP request 103, the P-CSCF 100 detects that there is no overload with respect to the service provided by the second application server 130. Accordingly, the P-CSCF 100 forwards the second SIP request 103 to the IMS CN 110, and after the acceptance of the second SIP request 103 by the second application server 130, sends a SIP OK response 104 to the UE 10 to confirm successful establishment of the session.

Figure 2:
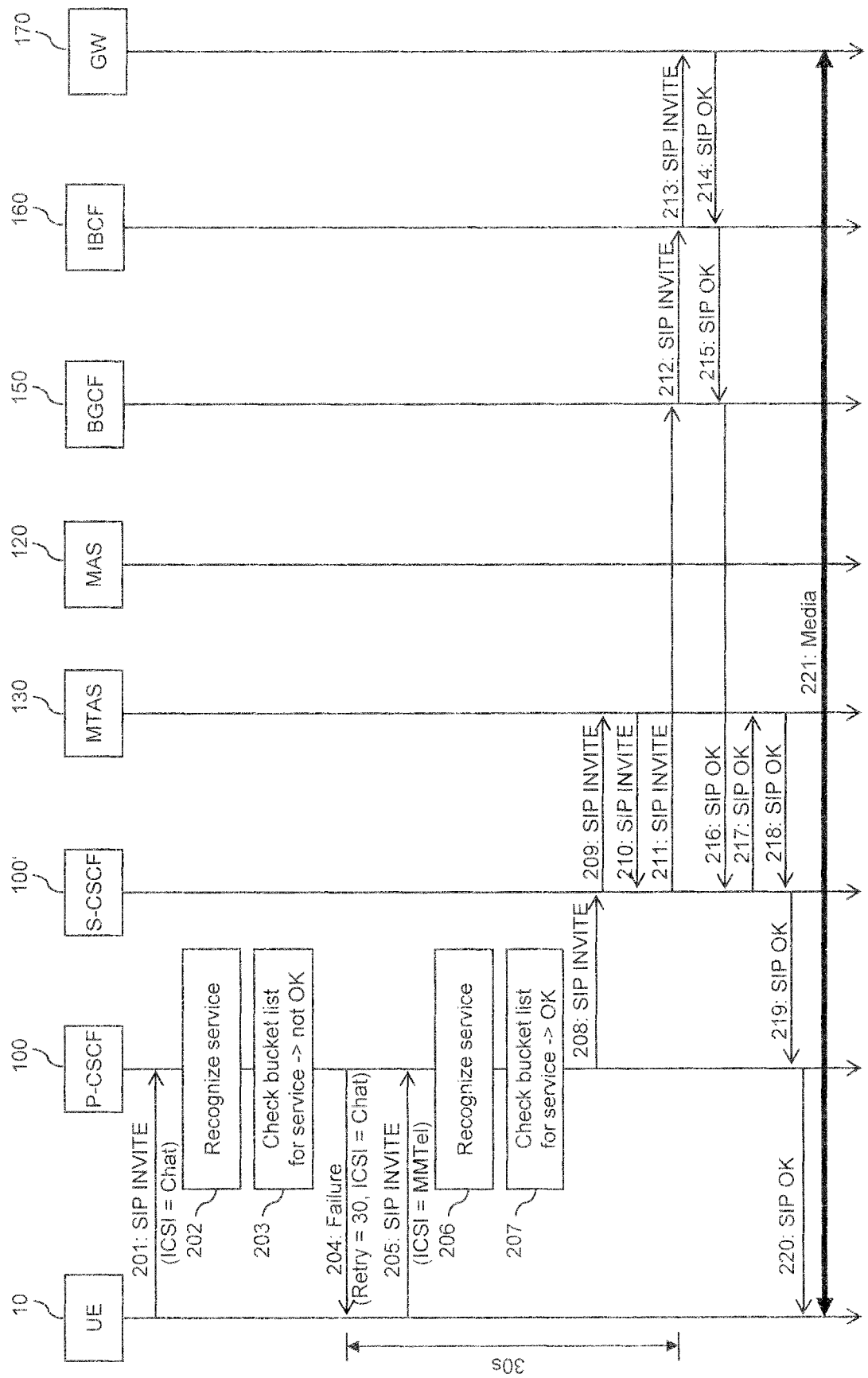
FIG. 2 shows an exemplary signaling flow of processes according to an embodiment of the invention.

FIG. 2 shows a signaling flow of exemplary processes for controlling session establishment. The processes of FIG. 2 involve the UE 10, the P-CSCF 100, an S-CSCF (Serving Call State Control Function) 100', the first application server 120, which in the illustrated example is assumed to be a MMTel application server (MTAS), the second application server 130, which in the illustrated example is assumed to be a messaging application server (MAS) providing a chat service, a BGCF (Breakout Gateway Control Function) 150, an IBCF 160, and a gateway 170. The S-CSCF 100', the BGCF 150, and the IBCF 160 may be regarded as components of the IMS CN.

As illustrated, the UE 10 may initially send an SIP INVITE request 201 for establishing a chat session controlled by the MAS 120. The SIP INVITE request 201 includes a PAS field or PPS (P-Preferred Service) field as specified by IETF RFC 6050. which indicates an ICSI corresponding to the chat service provided by the MAS 120.

Upon receiving the SIP INVITE request 201, the P-CSCF 100 recognizes the service to which the SIP INVITE request 201 relates, as indicated by step 202. In the illustrated example, the P-CSCF 100 would recognize that the SIP INVITE request 201 relates to the chat service.

As indicated by step 203, the P-CSCF 100 then detects whether there is an overload with respect to the service recognized at step 202. As illustrated, this may be accomplished by providing a corresponding bucket list for each of the supported services, and checking the bucket list for the service recognized at step 202, i.e., for the chat service. The bucket lists are assumed to include as those SIP INVITE requests relating to the respective service for which processing is not yet completed, i.e., no response has been sent by the P-CSCF 100.

In the illustrated example, an overload with respect to the chat service provided by the MAS 120 is assumed, resulting in the number of elements in the bucket list for the chat service exceeding a threshold. Accordingly, the P-CSCF 100 determines that an overload with respect to the chat service is present.

In response to detecting the overload with respect to the service at step 203, the P-CSCF 100 sends a failure message 204 to the UE 10. The failure message may be an SIP failure response of the server failure response category, e.g., a SIP server failure response of a type defined as indicating an overload with respect to a specific service. As further illustrated, the failure message 204 also indicates a Retry-After time window (in the illustrated example assumed to be 30 s) and includes a field indicating the overloaded service, i.e., the chat service in terms of the corresponding ICSI.

From the failure message 204, the UE 10 learns that the specific service of the SIP INVITE request 204 is overloaded, but that this overload may not pertain to other services, such as the MMTel service provided by the MTAS 130. If the UE 10 now needs to send a further SIP INVITE request, it first checks if the Retry-After time window has expired, and if this is not the case, if the further SIP INVITE request corresponds to the service indicated in the failure message 204 or to another service. Before expiry of the Retry-After time window, the UE 10 sends the further SIP INVITE request only if relates to another service than the service indicated in the failure message 204. If the further SIP INVITE request relates to the same service as indicated in the failure message 204, the UE 10 may or delay sending the further SIP INVITE message until the Retry-After time window has expired or may refrain from sending the further SIP INVITE message.

In the illustrated example, it is assumed that before expiry of the Retry-After time window indicated in the failure message 204, the UE 10 needs to send a further SIP INVITE request 205 for establishing a session of the MMTel service provided by the MTAS 130. Because the service is different from the service indicated in the failure message 204, the UE 10 sends the request 205 before expiry of the Retry-After time window. The further SIP INVITE request 205 includes a PAS field or PPS field which indicates an ICSI corresponding to the MMTel service provided by the MAS 120.

Upon receiving the further SIP INVITE request 205, the P-CSCF 100 recognizes the service to which the further SIP INVITE request 205 relates, as indicated by step 206. In the illustrated example, the P-CSCF 100 would recognize that the further SIP INVITE request 206 relates to the MMTel service.

As indicated by step 207, the P-CSCF 100 then detects whether there is an overload with respect to the service recognized at step 206. This may be accomplished checking the bucket list for the service recognized at step 206, i.e., the bucket list for the MMTel service.

In the illustrated example, no overload with respect to the MMTel service provided by the MTAS 130 is assumed, which means that in the number of elements in the bucket list for the MMTel service does not exceed a threshold defining an overload. Accordingly, the P-CSCF 100 determines that no overload with respect to the MMTel service is present.

Since no overload is present, the P-CSCF 100 forwards the further SIP INVITE request 205 for further processing. As illustrated in FIG. 2 this involves transmission of a cascade of SIP INVITE requests 208, 209, 210, 211, 212, 213 via the S-CSCF 100', the MTAS 130, the BGCF 150, and the IBCF 160 towards the gateway 170, transmission of a cascade of SIP OK responses 214, 215, 216, 217, 218, 219 from the gateway 170 to the P-CSCF 100, and transmission of an SIP OK response 220 from the P-CSCF 100 to the UE 10. The session is then successfully established and media 221 relating to the service may be transmitted between the UE 10 and the gateway 170.

It should be noted that the functionalities as explained in connection with FIG. 2 for the P-CSCF 100 may also be implemented in other nodes with proxy node functionalities, such as the S-CSCF 100' or the IBCF 160.

As can be seen, the service-aware handling of the overload situation allows for successfully establishing a session relating to a non-overloaded other service, even if the Retry-After time window in the failure message 204 indicating the overload has not yet expired.

Figure 3:
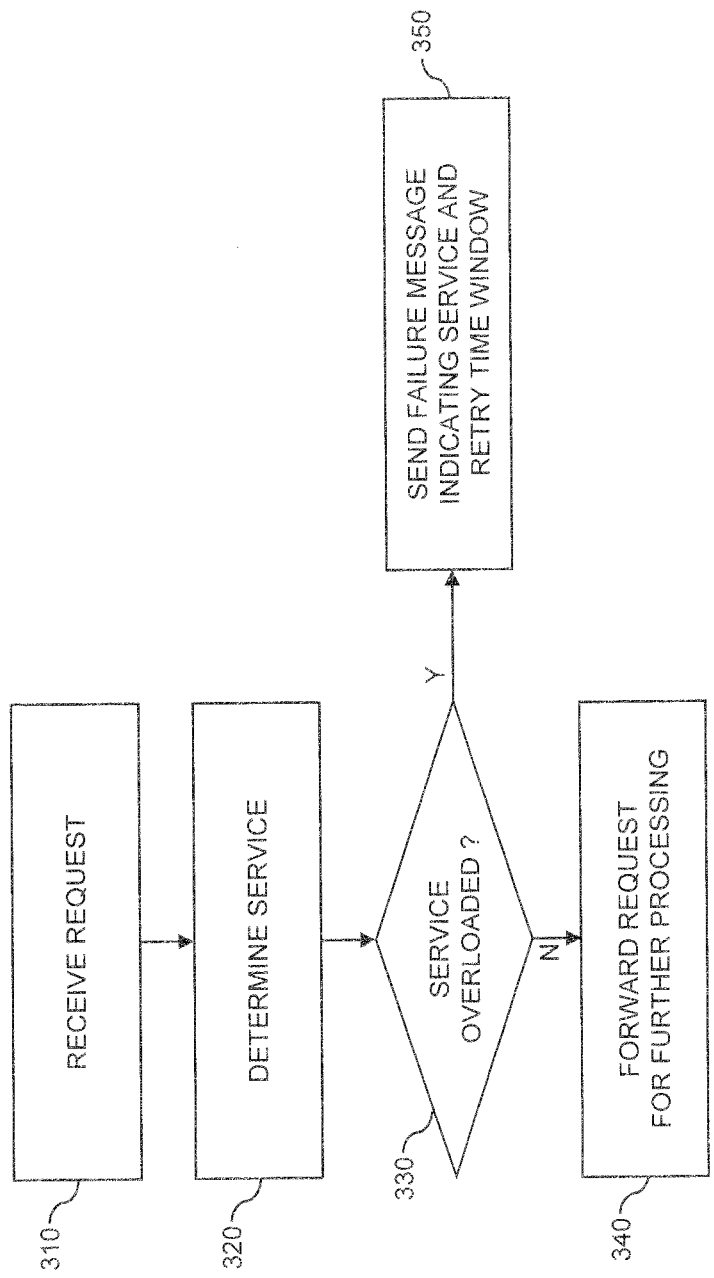
FIG. 3 shows a flowchart for illustrating a method according to an embodiment of the invention, which may be performed by a node of a communication network.

FIG. 3 shows a flowchart for illustrating a method which may be utilized for implementing the illustrated concepts. The method may be applied for providing multiple services in a communication network. These services may in particular be packet-based services, such as IMS services, utilizing SIP based methods for session establishment. The method is performed by a node of the communication network, e.g., a node acting as a proxy node for control plane messages relating to the services. Examples of such nodes are a CSCF (Call State Control Function) of the IMS, such as the above-mentioned P-CSCF 100 or S-CSCF 100', a IBCF of the IMS, such as the above-mentioned IBCF 160. If a processor-based implementation of the node is used, the steps of the method may be performed by one or more processors of the node.

At step 310, the node receives a request relating to one of the services. The request may for example have the purpose of establishing or otherwise controlling a session of this service. The session may be established by a communication device connected to the communication network, such as the UE 10. The request may for example be an SIP request, such as an SIP INVITE request. The request may also include a service identifier of the service, e.g., in the form of an ICSI.

At step 320, the node determines the service to which the request relates. If the request includes a service identifier, this may be accomplished on the basis of this service identifier. Alternatively, the service may be deduced from other information fields of the request which allow for distinguishing between the different services.

At step 330, the node determines whether an overload with respect to the service is present. For this purpose, the node may determine a list of pending requests relating to the service and then perform the determination depending on a number of elements in the list of pending requests. The bucket lists mentioned in connection with steps 203 and 207 of FIG. 2 are examples of such list of pending requests. If the number of elements in the list for the service determined at step 320 exceeds a threshold, the node may determine that an overload with respect to the service is present. Otherwise, the node may determine that there is no overload with respect to the service. Such thresholds for detecting the presence of an overload may be defined individually for each of the service.

In response to determining absence of an overload with respect to the service, the node proceeds to step 340, as indicated by branch "N". At step 340, the node forwards the request for further processing. This may involve sending the request or a subsequent request to another node. However, in some scenarios the further processing of the request could also be internal within the node.

In response to determining presence of an overload with respect to the service, the node proceeds to step 350, as indicated by branch "Y". At step 350, the node responds with a failure message to the request of step 310. The failure message indicates that the request was not processed. In some scenarios, the failure message may indicate that the request was not processed due to the overload with respect to the service, i.e., indicate a failure type. This may be accomplished implicitly by selecting a corresponding message type for the failure message or explicitly by indicating a failure reason in the failure message. Further, the failure message includes an indication of a time window after which the request may be retried, i.e., in the form of the above-mentioned Retry-After time window, and an identifier of the service to which the request relates (in other words, an identifier of the service for which the overload was found to be present). If a service identifier was included in the request of step 310, e.g., an ICSI, the same identifier may also be included in the failure message.

Figure 4:
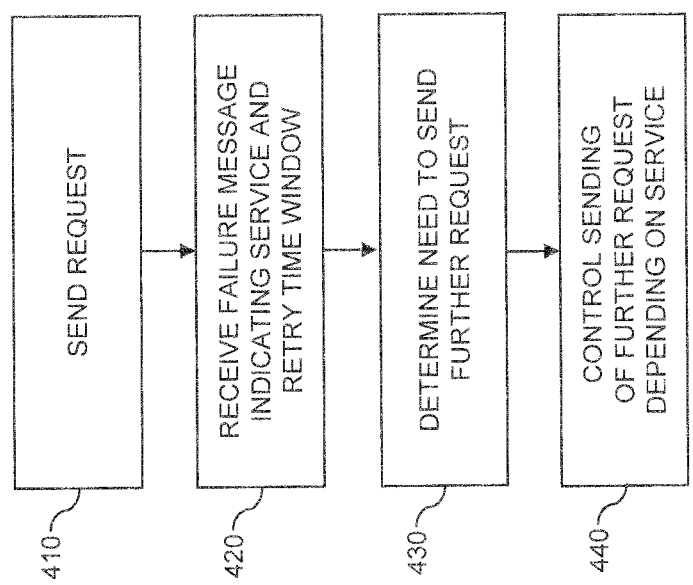
FIG. 4 shows a flowchart for illustrating a further method according to an embodiment of the invention, which may be performed by a communication device connected to the communication network.

FIG. 4 shows a flowchart for illustrating a further method which may be utilized for implementing the illustrated concepts. The method may be applied for providing multiple services in a communication network. These services may in particular be packet-based services, such as IMS services, utilizing SIP based methods for session establishment. The method is performed by a communication device connected to the communication network, such as the UE 10. If a processor-based implementation of the communication device is used, the steps of the method may be performed by one or more processors of the communication device.

At step 410, the communication device sends a request relating to one of the services to the communication network. The request may for example have the purpose of establishing or otherwise controlling a session of this service. The request may for example be an SIP request, such as an SIP INVITE request. The request may also include a service identifier of the service, e.g., in the form of an ICSI. The request may be sent to a node acting as a proxy node for control plane messages related to the service. For example, this node may correspond to a CSCF, such as the above-mentioned P-CSCF 100 or S-CSCF 100', or to an IBCF, such as the above-mentioned IBCF 160.

At step 420, the communication device receives a failure message from the communication network. The failure message indicates that the request was not processed. In some scenarios, the failure message may indicate that the request was not processed due to an overload with respect to the service, i.e., indicate a failure type. This may be accomplished implicitly by a corresponding message type for the failure message or explicitly by indicating a failure reason in the failure message. Further, the failure message includes an indication of a time window after which the request may be retried, i.e., in the form of the above-mentioned Retry-After time window, and an identifier of the service to which the request relates (in other words, an identifier of the service for which the overload was found to be present). The failure message may include a service identifier, e.g., an ICSI, which may be the same as included in the request of step 410.

At step 430, before expiry of the time window indicated in the failure message, the communication device determines a need to send a further request relating to one of the services to the communication network. For example, if the request of step 410 was an SIP INVITE request, the communication device may determine a need to send a further SIP INVITE request. This further request may relate to the same service as the request of step 410 and as indicated in the failure message of step 420, or may relate to another one of the services.

At step 440, the communication device controls sending of the further request to the communication network. This is accomplished depending on whether the further request relates to the service indicated in the failure message or to another one of the services.

For example, in response to the further request relating to the service indicated in the failure message, the communication device may send the further request after expiry of the time window indicated in the failure message. Further, in response to the further request relating to the service indicated in the failure message, the communication device may refrain from sending the further request. Further, in response to the further request relating to another one of the services, the communication device may send the further request before expiry of the time window.

It is to be understood that the methods of FIGS. 3 and 4 may be combined with each other in a system which includes a node of a communication network operating according to the method of FIG. 3 and a communication device operating according to the method of FIG. 4.

Figure 5:
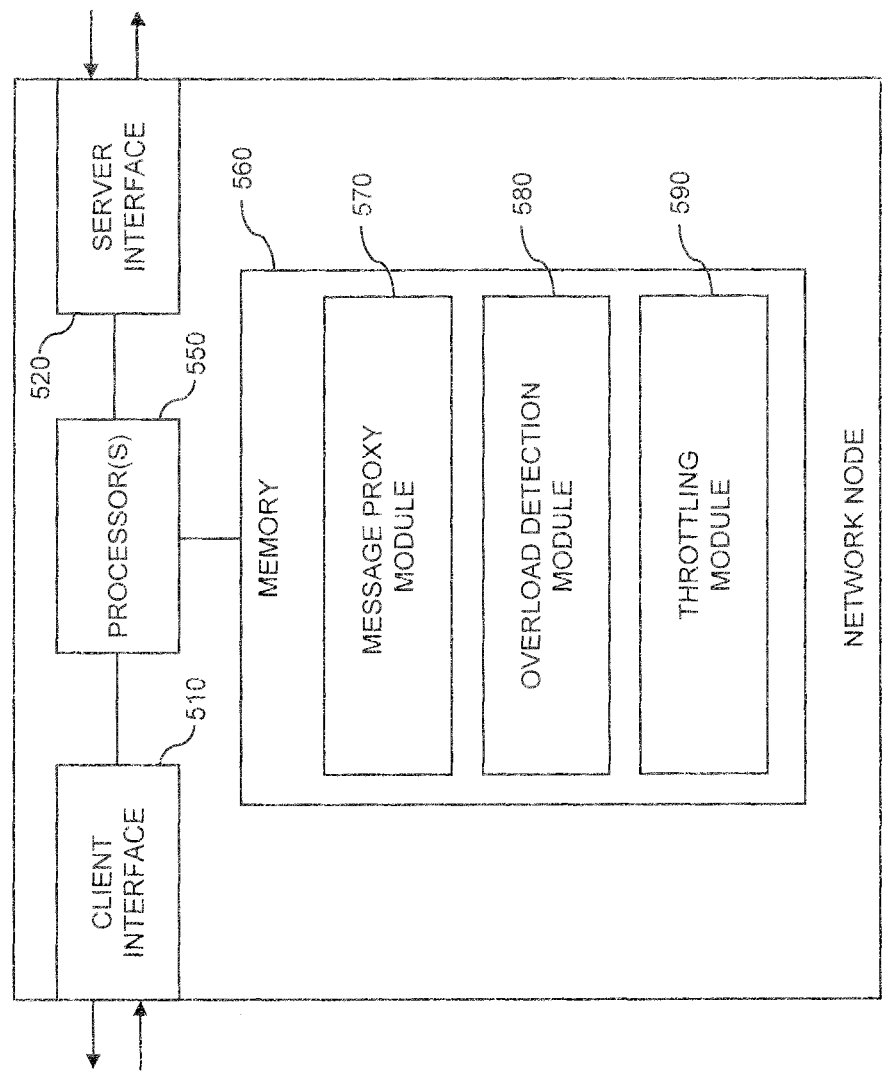
FIG. 5 schematically illustrates a network node according to an embodiment of the invention.

FIG. 5 illustrates exemplary structures which may be used for implementing the above concepts in a node for a communication network, e.g., a node implementing a CSCF, such as the above-mentioned P-CSCF 100 or S-CSCF 100', or a node implementing an IBCF, such as the above-mentioned IBCF 160.

As illustrated, the node may include a client interface 510 for connecting to one or more communication devices acting as clients for services provided by the communication network, such as the UE 10. Further, the node may include a server interface 520 for connecting to application servers providing the services, such as the application servers 120, 130. The interfaces 510 and 520 may be SIP based.

Further, the node includes one or more processors 550 coupled to the interfaces 510, 520, and 530, and a memory 560 coupled to the processor(s) 550. The memory 560 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 560 includes suitably configured program code to be executed by the processor(s) 850 so as to implement the above-described functionalities of the node. In particular, the memory 560 may include various program code modules for causing the node to perform processes as described above, e.g., corresponding to the method steps of FIG. 3.

As illustrated, the memory 560 may include a message proxy module 570 for implementing the above-described functionalities of receiving, sending and forwarding messages relating to different services. These functionalities may include the above-mentioned receiving and forwarding of requests relating to the services. Further, the memory 560 may include an overload detection module 580 for implementing the above-described functionalities of detecting an overload with respect to a service. Further, the memory 560 may include a throttling module 590 for implementing the above-mentioned functionalities of sending the service-specific failure response in response to detecting an overload with respect to one of the services.

It is to be understood that the structures as illustrated in FIG. 5 are merely schematic and that the node may actually include further components which, for the sake of clarity, have not been illustrated, e.g., further interfaces or processors. Also, it is to be understood that the memory 560 may include further types of program code modules, which have not been illustrated, e.g., program code modules for implementing known functionalities of a node implementing a P-CSCF. According to some embodiments, also a computer program may be provided for implementing functionalities of the node, e.g., in the form of a physical medium storing the program code and/or other data to be stored in the memory 560 or by making the program code available for download or by streaming.

Figure 6:
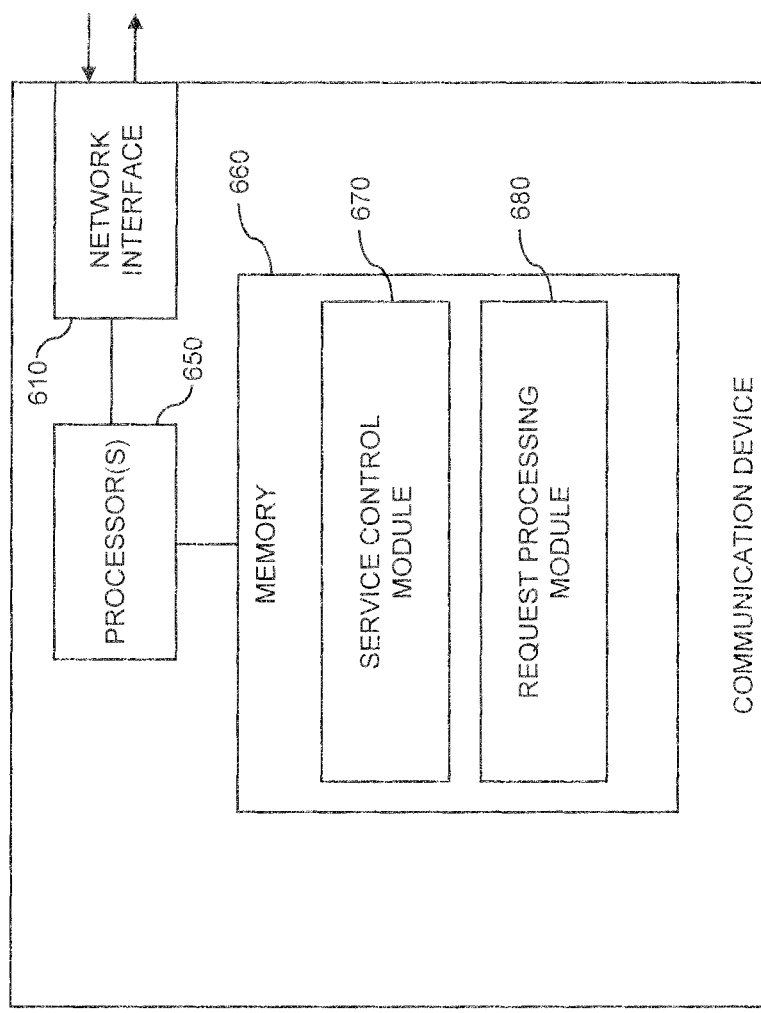
FIG. 6 schematically illustrates a communication device according to an embodiment of the invention.

FIG. 6 illustrates exemplary structures which may be used for implementing the above concepts in a communication device for operation in a communication network, such as the UE 10.

As illustrated, the communication device may include a network interface 610 for connecting to the communication network. The interface 610 may be SIP based.

Further, the communication device includes one or more processors 650 coupled to the interface 610, and a memory 660 coupled to the processor(s) 650. The memory 660 may include a ROM, e.g., a flash ROM, a RAM, e.g., a DRAM or SRAM, a mass storage, e.g., a hard disk or solid state disk, or the like. The memory 660 includes suitably configured program code to be executed by the processor(s) 650 so as to implement the above-described functionalities of the communication device. In particular, the memory 660 may include various program code modules for causing the communication device to perform processes as described above, e.g., corresponding to the method steps of FIG. 4.

As illustrated, the memory 660 may include a service control module 670 for implementing the above-described functionalities of sending and receiving control plane messages relating to different services. These functionalities may include the above-mentioned sending of requests relating to the services and receiving of responses to these requests. Further, the memory 560 may include a request processing module 680 for implementing the above-described functionalities of controlling the sending of requests depending on the service indicated in a failure message.

It is to be understood that the structures as illustrated in FIG. 6 are merely schematic and that the communication device may actually include further components which, for the sake of clarity, have not been illustrated, e.g., further interfaces or processors. Also, it is to be understood that the memory 660 may include further types of program code modules, which have not been illustrated, e.g., program code modules for implementing known functionalities of a UE as utilized in a 3GPP cellular network. According to some embodiments, also a computer program may be provided for implementing functionalities of the communication device, e.g., in the form of a physical medium storing the program code and/or other data to be stored in the memory 660 or by making the program code available for download or by streaming.

As can be seen, the concepts as described above may be used for controlling multiple services in a communication network. In particular, it can be avoided that an overload with respect to only a certain application service affects other services which are not overloaded. In this way, an improved service availability and user experience may be achieved. From the perspective of the operator of the communication network or the provider(s) of the services, this may also allow for increased service revenues. Further, network resources may be used more efficiently because blocking of requests to an application server which is not overloaded can be avoided.

It is to be understood that the examples and embodiments as explained above are merely illustrative and susceptible to various modifications. For example, the illustrated concepts may be applied in connection with various network technologies, without limitation to the above-mentioned example of 3GPP cellular network technology. Further, the illustrated concepts may be applied in connection with various kinds and numbers of services, without limitation to the above-mentioned IMS services. Moreover, it is to be understood that the above concepts may be implemented by using correspondingly designed software to be executed by one or more processors of an existing device, or by using dedicated device hardware. Further, it should be noted that the illustrated nodes may each be implemented as a single device or as a system of multiple interacting devices.

The invention claimed is:

1. A method of controlling multiple services in a communication network, the method comprising:
   a node of the communication network receiving a request relating to one of the multiple services;
   the node determining a service, from the multiple services, to which the request relates;
   depending on the service to which the request relates, the node determining a list of pending requests relating to the service;
   the node determining whether an overload with respect to the service is present based on a number of elements in the list of pending requests relating to the service exceeding a threshold;
   in response to determining absence of the overload with respect to the service, the node forwarding the request for further processing; and
   in response to determining presence of the overload with respect to the service, the node responding to the request with a failure message, wherein the failure message indicates that the request was not processed, and wherein the failure message comprises:
   an indication of a time window after which the request is retried; and
   an identifier of the service to which the request relates.

2. The method of claim 1, wherein the failure message further comprises an indication that the request was not processed due to the overload with respect to the service.

3. The method of claim 1, wherein the identifier of the service is also indicated in the request.

4. The method of claim 1, wherein the request is a Session Initiation Protocol INVITE request.

5. The method of claim 1, wherein the node is a Call Session Control Function of an Internet Protocol Multimedia Subsystem.

6. The method of claim 1, wherein the multiple services comprise a messaging service and a multimedia telephony service.

7. A method of controlling multiple services in a communication network, the method comprising:
   a communication device sending a request relating to a service of the multiple services to a node of the communication network, wherein the node determines the service and a list of pending requests relating to the service, and wherein the node further determines whether an overload with respect to the service is present based on a number of elements in the list of pending requests relating to the service exceeding a threshold;

in response to the request, the communication device receiving a failure message from the node of the communication network, wherein the failure message indicates presence of the overload with respect to the service and that the request was not processed, and wherein the failure message comprises: an indication of a time window after which the request is retried; and an identifier of the service to which the request relates;

before expiry of the time window, the communication device determining a need to send a further request relating to one of the multiple services to the communication network;

depending on whether the further request relates to the service indicated in the failure message or to another one of the multiple services, the communication device controlling sending of the further request to the communication network;

the communication device sending the further request to the communication network before expiry of the time window when the further request relates to the other one of multiple services; and the communication device sending the further request to the communication network after the expiry of the time window when the further request relates to the service indicated in the failure message.

8. The method of claim 7, wherein the failure message further comprises an indication that the request was not processed due to the overload with respect to the service.

9. The method of claim 7, wherein the identifier of the service is also indicated in the request.

10. The method of claim 7, wherein the request is a Session Initiation Protocol INVITE request.

11. The method of claim 7, wherein the request is sent to a Call Session Control Function of an Internet Protocol Multimedia Subsystem.

12. The method of claim 7, wherein the multiple services comprise a messaging service and a multimedia telephony service.

13. A node for a communication network, the node comprising:
at least one interface for control plane messages relating to multiple services supported by the communication network; and
a processing circuit configured to:
  receive a request relating to one of the multiple services;
  determine a service, from the multiple services, to which the request relates;
  depending on the service to which the request relates, determine a list of pending requests relating to the service;
  determine whether an overload with respect to the service is present based on a number of elements in the list of pending requests relating to the service exceeding a threshold;
  in response to a determination of absence of the overload with respect to the service, forward the request for further processing; and
  in response to a determination of presence of the overload with respect to the service, respond to the request with a failure message, wherein the failure message indicates that the request was not processed, and wherein the failure message comprises:
    an indication of a time window after which the request is retried; and
    an identifier of the service to which the request relates.

14. The node of claim 13, wherein the failure message further comprises an indication that the request was not processed due to the overload with respect to the service.

15. The node of claim 13, wherein the identifier of the service is also indicated in the request.

16. The node of claim 13, wherein the request is a Session Initiation Protocol INVITE request.

17. The node of claim 13, wherein the node is a Call Session Control Function of an Internet Protocol Multimedia Subsystem.

18. The node of claim 13, wherein the multiple services comprise a messaging service and a multimedia telephony service.

19. A communication device, comprising:
at least one interface for utilizing multiple services supported by a communication network; and
processing circuitry configured to:
  send a request relating to a service of the multiple services to a node of the communication network, wherein the node determines the service and a list of pending requests relating to the service, and wherein the node further determines whether an overload with respect to the service is present based on a number of elements in the list of pending requests relating to the service exceeding a threshold;
  in response to the request, receive a failure message from the node of the communication network, the failure message indicating presence of the overload with respect to the service and that the request was not processed, and the failure message comprising:
    an indication of a time window after which the request is retried; and
    an identifier of the service to which the request relates;
  before expiry of the time window, determine a need to send a further request relating to one of the multiple services to the communication network;
  depending on whether the further request relates to the service indicated in the failure message or to another one of the multiple services, control sending of the further request to the communication network;
  send the further request to the communication network before expiry of the time window when the further request relates to the other one of multiple services; and
  send the further request to the communication network after the expiry of the time window when the further request relates to the service indicated in the failure message.

20. The communication device of claim 19, wherein the failure message further comprises an indication that the request was not processed due to llanllthe overload with respect to the service.

21. The communication device of claim 19, wherein the identifier of the service is also indicated in the request.

22. The communication device of claim 19, wherein the request is a Session Initiation Protocol INVITE request.

23. The communication device of claim 19, wherein the request is sent to a Call Session Control Function of an Internet Protocol Multimedia Subsystem.

24. The communication device of claim 19, wherein the multiple services comprise a messaging service and a multimedia telephony service.

25. A non-transitory computer readable recording medium storing a computer program product for controlling multiple services in a communication network, the computer program product comprising software instructions which, when run on processing circuitry of a node of the communication network, cause the node to:
- receive a request relating to one of the multiple services;
- determine a service, from the multiple services, to which the request relates;
- depending on the service to which the request relates, determine a list of pending requests relating to the service;
- determine whether an overload with respect to the service is present based on a number of elements in the list of pending requests relating to the service exceeding a threshold;
- forward, in response to a determination of absence of the overload with respect to the service, the request for further processing; and
- respond, in response to a determination of presence of the overload with respect to the service, to the request with a failure message, wherein the failure message indicates that the request was not processed, and wherein the failure message comprises: an indication of a time window after which the request is retried;
- and an identifier of the service to which the request relates.

26. A non-transitory computer readable recording medium storing a computer program product for controlling multiple services in a communication network, the computer program product comprising software instructions which, when run on processing circuitry of a communication device, cause the communication device to:
- send a request relating to a service of the multiple services to a node of the communication network, wherein the node determines the service and a list of pending requests relating to the service, and wherein the node further determines whether an overload with respect to the service is present based on a number of elements in the list of pending requests relating to the service exceeding a threshold;
- receive, in response to the request, a failure message from the node of the communication network, wherein the failure message indicates presence of the overload with respect to the service and that the request was not processed, and wherein the failure message comprises:
    - an indication of a time window after which the request is retried; and
    - an identifier of the service to which the request relates;
- determine, before expiry of the time window, a need to send a further request relating to one of the multiple services to the communication network;
- control, depending on whether the further request relates to the service indicated in the failure message or to another one of the multiple services, sending of the further request to the communication network;
- send the further request to the communication network before expiry of the time window when the further request relates to the other one of multiple services; and
- send the further request to the communication network after the expiry of the time window when the further request relates to the service indicated in the failure message.

* * * * *